May 26, 1953 L. J. SMITH 2,639,883
FLOW REGULATOR
Filed Sept. 30, 1948
Fig.1.
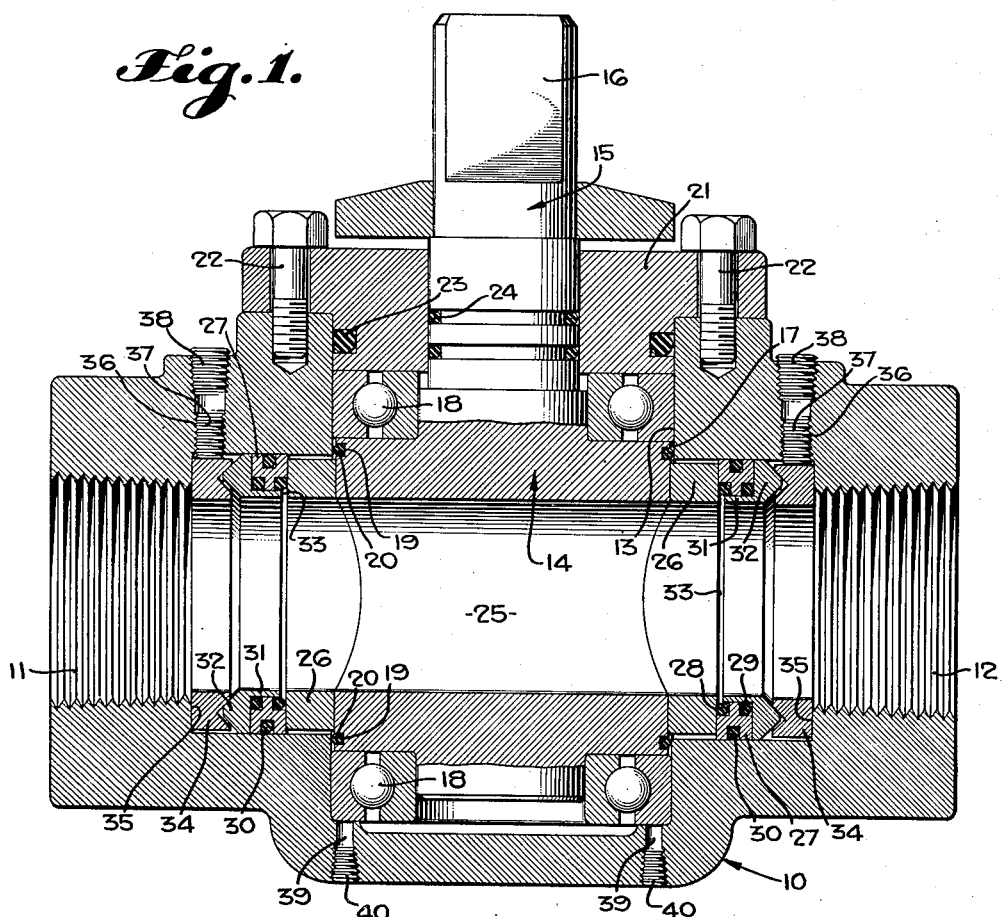
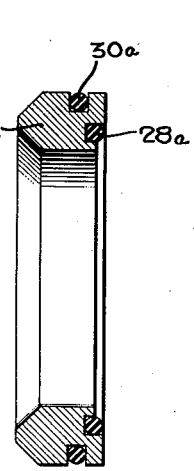
Fig.2.
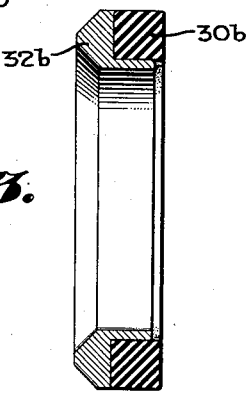
Fig.3.
INVENTOR,
LOUIS J. SMITH.
BY
Hazard & Miller
ATTORNEYS Patented May 26, 1953

2,639,883

UNITED STATES PATENT OFFICE 2,639,883

FLOW REGULATOR

Louis J. Smith, Los Angeles, Calif.

Application September 30, 1948, Serial No. 51,949

6 Claims. (Cl. 251—113)

This invention relates to valves, flow beans and similar devices used to control or regulate fluid flow through pipe lines and similar conduits.

In controlling or regulating flow from oil and gas wells extremely high pressures are encountered. Heretofore rotary plug type valves have frequently been employed wherein the plug is tapered and rotates on a tapered seat, tapers being employed in order to effect a tight seal. However, due to the high pressures encountered it is necessary to force or urge the tapered plug toward the small end of its seat with such great force to maintain a tight seal that it is extremely difficult to rotate the plug in opening or closing the valve or flow bean. Not infrequently it is necessary to elevate or jack the tapered plug from its tapered seat in order to be able to turn the plug from open to closed position, or vice versa, against the effects of the high pressures that are effective thereon.

A primary object of the present invention is to provide an improved valve or flow bean which is so designed that it can be easily opened and closed even though installed in a pipe line or other conduit conducting fluids under extremely high pressures. To this end the present invention contemplates the use of a body having a passage therethrough for the flow of fluids and in which there is rotatable a cylindrical plug that is adequately supported for rotation within the body by means of radial bearings enabling the plug to be turned readily even in the presence of high pressures. As a means for effectively preventing leakage around the plug, sealing rings are employed that are disposed in the passage and which are movable against the periphery of the plug. As the plug does not closely fit the bore of the body but has sealing engagement only with the sealing rings, frictional resistance to rotation of the plug is greatly reduced and at the same time a highly effective leak-proof seal is established.

Another object of the invention is to provide a valve or flow bean wherein the pressure with which the sealing rings are urged against the sides of the plug may be adjusted or varied from the exterior of the body. Such an adjustment enables the sealing rings to be urged against the sides of the body with that pressure that is required to maintain an effective seal and at the same time enables the plug and sealing rings to be removed from the top of the body whenever this is required for purposes of inspection or replacement without requiring the removal of the body from the pipe line or conduit in which it is disposed. In manifolding the flows from oil wells and gas wells the valves or flow beans that are employed frequently have their bodies incorporated in the pipe line or conduit in such a manner that removal of any part of the valve or flow bean requires removal of the entire structure from the pipe line. The ability to remove and replace either the plug or the sealing rings, or both, either for purposes of inspection or replacement, without disturbing the body or its connection with the pipe line or conduit, is consequently highly desirable.

With the foregoing and other objects in view, which will be made manifest in the following detailed description and specifically pointed out in the appended claims, reference is had to the accompanying drawings for an illustrative embodiment of the invention, wherein:

Figure 1 is a longitudinal vertical section through a valve embodying the present invention;

Fig. 2 is a sectional view through an alternative form of cam ring which may be employed in the valve illustrated in Fig. 1; and Fig. 3 is a sectional view of another alternative form of cam ring which may be employed in the valve shown in Fig. 1.

Referring to the accompanying drawings wherein similar reference characters designate similar parts throughout, the improved valve consists of a body generally indicated at 10 having a longitudinal passage therethrough illustrated as being internally threaded at each end as at 11 and 12 for attachment in a pipe line or conduit. Any equivalent attaching means may be employed in lieu of the threads 11 and 12. The longitudinal passage in the body is intersected by a vertical cylindrical bore 13 within which there is disposed a cylindrical plug 14 having a stem 15 that may be flatted as at 16 for the application of a wrench by which the plug can be rotated from open to closed position, or vice versa. The external diameter of the plug 14 is slightly smaller than the bore 13 so that there is a substantial clearance between the plug and the body, such clearance being indicated at 17. The plug 14 is shouldered for anti-friction radial bearings, generally indicated at 18, the outer races of which fit the bore 13 closely. Adjacent these bearings the plug is grooved as at 19 to receive O rings 20 which engage the walls of the bore 13 and effectively serve to pack off leakage around the top and bottom of the plug. The plug is retained in the bore 13 by means of a cap 21 secured to the body such as by cap screws 22. O rings 23 are recessed in the cap and serve to prevent leakage between the cap and the body and in a similar manner O rings 24 are recessed in the stem 15 to prevent leakage between the stem and the cap 21.

When the present invention is embodied on a valve the plug 14 has a diametrical bore 25 formed therein which, in the open position shown in Fig. 1, is aligned with a longitudinal passage through the body 10. It will be understood, however, that the invention is equally applicable to a flow bean wherein the passage 25 in the plug 14 is shouldered and is designed to receive a bean or choke that can be introduced and removed through a normally closed opening in the side of the body 10 which is aligned with one end of the bore 25 when the plug 14 is turned into its closed position or ninety degrees from the position shown.

In accordance with the present invention, sealing rings 26 are disposed in the longitudinal passage in the body 10 on opposite sides of the plug 14. These sealing rings have internal diameters substantially equal to the diameter of bore 25, and are shaped and lapped to closely fit the ground peripheral surface on the plug 14 immediately surrounding the ends of the bore 25. The external diameter of these sealing rings is slightly less than the internal diameter of body 10 surrounding them so that a slight clearance is afforded to enable the sealing rings to closely fit the surface of the plug when the parts are assembled in the body.

Outwardly of the sealing rings 26 there are packing rings 27. Each packing ring has its inner corners recessed to accommodate O rings 28 and 29. The outer surface of each packing ring is grooved to receive an O ring 30. The packing rings 27 and their associated O rings are positioned on flange portions 31 of cam rings 32. The flanges 31 are held by the packing rings 27 in slight spaced relation to the sealing rings 26 so that there is a slight exposed area 33 on the back of each sealing ring 26 upon which pressure of the fluid passing through the body 10 may be effective to urge the sealing ring against the plug 14.

Each cam ring 32 has a beveled face complementary to a companion cam ring 34, the arrangement being such that when the companion cam ring 34 is laterally displaced with relation to the cam ring 32, the cam ring 32 will be urged in an axial direction and crowd the packing ring 27 and the sealing ring toward the plug. To this end it will be observed that the cam ring 32 fits the interior of the body 10 rather closely but that there is a substantial clearance between the exterior of cam ring 34 and the interior of the body to permit of such lateral displacement. The companion cam ring 34 rests against a shoulder 35 formed adjacent each threaded end of the body. Means is provided for shifting or displacing each companion cam ring 34 from the exterior of the body and to this end threaded apertures 36 are formed in the top of the body opposite the top of each companion cam ring. Set screws 37 are disposed therein and can be manipulated on the insertion of a wrench when tapered pipe plugs 38 are removed. In this manner, by removing the pipe plugs 38 the set screws 37 can be turned to displace the companion cam rings 34 and thus crowd the sealing rings against the sides of the plug 14 with whatever force is required to effect a seal in addition to the force exerted by the pressure effective on the exposed areas 33. In this connection it will be observed that if the set screws 37 are backed off or unscrewed the companion cam rings can return to their coaxial positions with relation to the cam rings 32, thus relieving the pressure of the sealing rings 26 against the sides of the plug. When this has been accomplished it will be noted that on removal of the cap screws 22 the cap 21 may be removed from the body and the entire plug withdrawn through the top of the body. Furthermore, as the diameter of the bore 13 is greater than the outside diameter of the sealing rings 26, the sealing rings can also be withdrawn through the bore 13. Usually the greatest wear or cutting action will occur between the sealing rings 26 and the plug 14 and the improved valve is consequently highly advantageous in that it enables these parts to be removed, inspected, repaired or replaced without in any way disturbing the connection between the body 10 and the adjoining pipe sections that are screwed into the threaded ends 11 and 12. To facilitate removal of the plug and its associated bearings, holes 39 may be drilled in the bottom of the body opposite the outer race and the lower radial bearing 18. These holes are normally closed by pipe plugs 40 and upon removal of the pipe plugs, rods or similar instruments may be inserted through the holes 39 to drive the plug out of the body.

It will be appreciated from the above described construction that as the plug 14 has a considerable clearance with the body 10 the only friction resisting turning of the plug is that friction existing between the stem 15 and the cap 21, the friction of the radial bearings, and the friction between the surface of the plug and the sealing rings 26. The sum of all these frictions is usually such that the plug can be readily turned from open to closed position, or vice versa, even though the pressure of the fluid flowing in the body 10 is extremely high although the primary seal against leakage is effected by the close metal-to-metal contact between the sealing rings 26 and the plug 14. Any leakage that takes place is effectively confined by the O rings 17, 24 and 23. Leakage around the sealing rings 26 and around the cam rings 32 is effectively prevented by the O rings 28, 29 and 30.

In the construction illustrated in Fig. 2, the cam ring and packing ring are, in effect, combined and the single cam ring 32a functions not only as a cam ring but as a carrier for the O rings 28a and 30a which perform the same functions as the O rings 28 and 30. In this form of construction, as the packing ring and cam ring are combined together the O ring 29 is omitted.

In the construction illustrated in Fig. 3, the cam ring is illustrated at 32b and has mounted thereon a ring 30b designed to closely fit the interior of the valve body and to project from the cam ring a sufficient distance so as to bear against the sealing ring 26. The ring 30b may be formed or rubber, synthetic rubber, or other resilient material designed to form an effective seal between the cam ring and the body and between the cam ring and the sealing ring to prevent leakage. The material sold on the market under the trade name "Hi-Car" is suitable for this purpose.

From the above described construction it will be appreciated that an improved valve or flow bean is provided which is of relatively simple construction and which enables the parts to be easily manufactured and assembled. The plug can be readily rotated at all times because of the minimum friction therewith even under the most severe pressure conditions. Adjustment of the pressure with which the sealing rings 26 press against the plug is permissible at all times from the exterior of the body 10 without disturbing the body or its connections with the pipe line. Likewise, removal of the plug and the sealing rings for inspection or repair is permissible without disturbing or disconnecting the body from the pipe line.

Various changes may be made in the details of construction without departing from the spirit and scope of the invention as defined by the appended claims.

I claim:

1. A flow regulating or controlling device comprising a body having a passage for flow therethrough, a rotary plug rotatable in the body adapted upon rotation to regulate flow through the passage, said plug being cylindrical and having radial bearings above and below said passage, at least one sealing ring in the passage having one side adapted to be moved into engagement with the side of the plug to seal thereagainst, a packing ring having one side against the other side of the sealing ring carrying packing engageable with the sealing ring and with the interior of the body, cam rings disposed against the other side of the packing adapted on displacement of one cam ring relative to the other to force the packing ring and sealing ring toward the plug, means restraining one of said cam rings against axial movement in an outward direction, and means operable from the exterior of the body for displacing one of the cam rings relative to the other.

2. A flow regulating or controlling device comprising a body having a passage for flow therethrough, a rotary plug rotatable in the body adapted upon rotation to regulate flow through the passage, said plug being cylindrical and having radial bearings above and below said passage, at least one sealing ring in the passage having one side adapted to be moved into engagement with the side of the plug to seal thereagainst, a packing ring having one side against the other side of the sealing ring carrying packing engageable with the sealing ring and with the interior of the body, cam rings disposed against the other side of the packing adapted on displacement of one cam ring relative to the other to force the packing ring and sealing ring toward the plug, means restraining one of said cam rings against axial movement in an outward direction, the body having a threaded aperture therein opposite the displaceable cam ring, a set screw therein for displacing said cam ring, and means normally closing the threaded aperture.

3. A flow regulating or controlling device comprising a body having a passage for flow therethrough, a rotary plug rotatable in the body adapted upon rotation to regulate flow through the passage, at least one sealing ring in the passage having one side adapted to be moved into engagement with the side of the plug to seal thereagainst, a packing ring having one side against the other side of the sealing ring carrying packing engageable with the sealing ring and with the interior of the body, cam rings disposed against the other side of the packing ring adapted on displacement of one cam ring relative to the other to force the packing ring and sealing ring toward the plug, means restraining one of said cam rings against axial displacement in an outward direction, the body having a threaded aperture therein opposite the displaceable cam ring, a set screw therein for displacing said cam ring, and means normally closing the threaded aperture.

4. A flow regulating or controlling device comprising a body having a passage for flow therethrough, a rotary plug rotatable in the body adapted upon rotation to regulate flow through the passage, at least one sealing ring in the passage having one side adapted to be moved into engagement with the side of the plug to seal thereagainst, a packing ring disposed against the other side of the sealing ring carrying packing engageable with the sealing ring and with the interior of the body, a cam mounted in the body and engageable with the packing ring for forcing the packing ring and the sealing ring toward the plug, the body providing a passageway through the walls thereof, and means within the passageway for moving the cam to adjust the pressure with which the sealing ring is urged against the plug.

5. A flow regulating or controlling device comprising a body having a passage for flow therethrough, a rotary plug rotatable in the body adapted upon rotation to regulate flow through the passage, at least one sealing ring in the passage having one side adapted to be moved into engagement with the side of the plug to seal thereagainst, a packing ring having one side against the other side of the sealing ring carrying packing engageable with the sealing ring and with the interior of the body, cam rings disposed against the other side of the packing ring adapted on displacement of one cam ring relative to the other to force the packing ring and sealing ring toward the plug, means restraining one of said cam rings against axial displacement in an outward direction, and means operable from the exterior of the body for displacing one of the cam rings relative to the other.

6. A flow regulating or controlling device comprising a body having a passage for flow therethrough, a rotary plug rotatable in the body adapted upon rotation to regulate flow through the passage, at least one sealing ring in the passage having one side adapted to be moved into engagement with the side of the plug to seal thereagainst, a packing ring having one side against the other side of the sealing ring carrying packing, the packing being engageable with the sealing ring and with the interior of the body, and means operable from the exterior of the body for forcing the packing ring and sealing ring toward the plug.

LOUIS J. SMITH.

References Cited in the file of this patent

UNITED STATES PATENTS

| Number | Name | Date |
|---|---|---|
| 1,057,297 | Tartrais | Mar. 25, 1913 |
| 2,390,201 | Bredenbeck | Dec. 4, 1945 |
| 2,529,412 | Parker | Nov. 7, 1950 |
| 2,600,898 | Maxwell | June 17, 1952 |

FOREIGN PATENTS

| Number | Country | Date |
|---|---|---|
| 415,810 | Great Britain | of 1934 |
| 516,614 | Great Britain | of 1939 |